United States Patent

Schall et al.

[11] Patent Number: 6,110,437
[45] Date of Patent: Aug. 29, 2000

[54] METHOD FOR PREPARING A MIXTURE OF POWDERED METAL OXIDES FROM NITRATES THEREOF IN THE NUCLEAR INDUSTRY

[75] Inventors: Gilbert Schall; Sylvie Davied, both of Narbonne; Robert Faron, deceased, late of Courbevoie, all of France, by Denise Faron, executor

[73] Assignee: Comurhex (S.A.), Velizy-Villacoublay Cedex, France

[21] Appl. No.: 09/091,243

[22] PCT Filed: Dec. 12, 1996

[86] PCT No.: PCT/FR96/01993

§ 371 Date: Mar. 2, 1999

§ 102(e) Date: Mar. 2, 1999

[87] PCT Pub. No.: WO97/21629

PCT Pub. Date: Jun. 19, 1997

[30] Foreign Application Priority Data

Dec. 12, 1995 [FR] France ................... 95 14883

[51] Int. Cl.[7] .................................... C01G 43/01
[52] U.S. Cl. ................ 423/260; 75/369; 75/344; 423/3; 423/261; 423/251; 423/252
[58] Field of Search ................ 423/3, 260, 261, 423/251, 252; 75/344, 369

[56] References Cited

U.S. PATENT DOCUMENTS

| 3,725,293 | 4/1973 | Haas . |
| 4,225,455 | 9/1980 | Haas . |
| 4,364,859 | 12/1982 | Ohtsuka et al. . |
| 5,139,709 | 8/1992 | Huang et al. .................. 264/0.5 |

FOREIGN PATENT DOCUMENTS

| 0143726 | 6/1985 | European Pat. Off. . |
| 0328742 | 8/1989 | European Pat. Off. . |
| 3802047 | 8/1989 | Germany . |
| 8908610 | 9/1989 | WIPO . |
| 9534508 | 12/1995 | WIPO . |

OTHER PUBLICATIONS

EP 0143726—English Abstract.
EP 0328742—English Abstract.
DE 3802047—English Abstract.
WO 8908610—English Abstract.
WO 9534508—English Abstract.

*Primary Examiner*—Ngoclan Mai
*Attorney, Agent, or Firm*—Millen, White, Zelano & Branigan, P.C.

[57] ABSTRACT

A thermal decomposition method useful in the nuclear industry for preparing a powdered mixture of metal oxides having suitable reactivity from nitrates thereof in the form of an aqueous solution or a mixture of solids. According to the method, the solution or the mixture of solids is thermomechanically contacted with a gaseous fluid in the contact area of a reaction chamber, said gaseous fluid being fed into the reaction chamber at the same time as the solution or mixture at a temperature no lower than the decomposition temperature of the nitrates, and having a mechanical energy high enough to generate a fine spray of the solution or a fine dispersion of the solid mixture, and instantly decompose the nitrates. The resulting oxide mixtures may be used to prepare nuclear fuels.

32 Claims, 1 Drawing Sheet

METHOD FOR PREPARING A MIXTURE OF POWDERED METAL OXIDES FROM NITRATES THEREOF IN THE NUCLEAR INDUSTRY

FIELD OF THE INVENTION

The invention relates to a process for obtaining a mixture of pulverulent metal oxides, of appropriate reactivity, belonging to the nuclear industry, from their nitrates which are in the form of an aqueous solution or of a mixture of solids which are naturally pulverulent or made pulverulent.

The invention relates more particularly to a process for the production of a mixture of pulverulent metal oxides from their nitrates, using at least two metal elements which can be involved in the formation of a nuclear fuel, such as uranium, plutonium, thorium (U, Pu, Th) and other elements which are fissile, fertile, or permitting simulations, such as cerium (Ce).

The invention also relates more particularly to a process for the production of a mixture of pulverulent metal oxides from their nitrates, using at least one of the metal elements such as uranium, taken in combination with at least one of the rare-earth elements such as gadolinium (Gd), in order to control the fission of fuels based on mixed sintered oxides.

As a base material to be treated according to the process of the invention, the elements involved in the form of nitrates and leading by their decomposition to mixtures of pulverulent metal oxides can have various origins: they may or may not have undergone irradiation and, consequently, have any isotopic composition. In the particular case of uranium, this element may be of natural origin, or may have been enriched beforehand, for example by gaseous diffusion, by ultracentrifuging or by laser way, may have been irradiated, and, in this case, issue from the reprocessing of irradiated fuels after cooling and separation of plutonium (Pu) and of fission products.

For the purposes of the present invention:

"metal oxides" should be understood by a mixture of at least two oxides such as the uranium oxide ($UO_3$), plutonium oxide ($PuO_2$), thorium oxide ($ThO_2$), caesium oxide ($Cs_2O$), ruthenium oxide ($RuO_2$) and rare earths oxides such as, for example, gadolinium oxide ($Gd_2O_3$) and cerium oxide ($CeO_2$), of which the favoured pairs are U-Pu, U-Th, U-Cs, U-Ru, U-Gd and U-Ce.

by the expression "appropriate reactivity" the Applicant is intended to define the most suitable specific surface with which it is desirable to provide for the metal oxides to optimize their suitability for conversions subsequent to the denitration, such as, for example:

thermal conversion of $UO_3$ to $U_3O_8$, (intermediate oxide before its subsequent reduction);

or direct reduction of $UO_3$ to $UO_2$, followed by hydrofluorination using hydrofluoric acid;

or else production of a mixed oxide powder of ceramic quality, intended to be converted into nuclear fuels by compaction and sintering of the compacted pellets.

under the name "metal nitrates" the Applicant intends to denote the uranyl nitrate, mixed with at least one of the nitrates of plutonium, thorium, caesium, ruthenium and of rare earths such as, for example, gadolinium and cerium.

In the case of the direct reduction of $UO_3$ to $UO_2$, followed by hydrofluorination of $UO_2$ to $UF_4$, the reactivity of $UO_2$ is correlatively related to the specific surface of $UO_3$ resulting from the denitration. It is found to be desirable that the suitabilities for the direct reduction of $UO_3$ to $UO_2$ and for the hydrofluorination of $UO_2$ to $UF_4$ should be regulated on demand during the denitration of uranyl nitrate by the production of a uranium oxide $UO_3$ having a specific surface adapted to each technology.

In the case of the production of metal oxide powders of ceramic quality, which are intended for the production of nuclear fuels, [such as uranium dioxide ($UO_2$) or its mixture with at least one of the oxides of plutonium ($PuO_2$), thorium ($ThO_2$), caesium ($Cs_2O$), ruthenium ($RuO_2$), gadolinium ($Gd_2O_3$) and cerium ($CeO_2$)] it is well known that the sintering of such powders makes it possible to obtain high-density pellets, on condition that powders of high specific surface are selected and that an optimum sintering protocol is followed for each value of specific surface (treatise on inorganic chemistry by Paul Pascal, volume XV, pages 300 to 304, 1961 edition).

STATES OF THE ART

Numerous processes for the production of mixtures of metal oxides are known, by precipitation or by decomposition of their nitrates: they are generally intended for the preparation of nuclear fuels containing uranium alone (in the $UO_2$ form), of mixed fuels formed by mixtures in variable proportions of at least two elements such as uranium, plutonium and thorium ($UO_2$, $PuO_2$, $ThO_2$).

However, these known processes can also be employed for obtaining a mixture of metal oxides for the manufacture of control rods for the fission of nuclear fuels, obtained by means of mixed sintered oxides of the U-Gd type for example, in the $UO_2,Gd_2O_3$ form.

Regardless of whether these are mixed fuels (such as $UO_2,PuO_2$) or control rods (such as $UO_2,Gd_2O_3$), these products can be produced either by precipitation of metal compounds from nitrate solutions, or by separate decomposition of nitrates of each of the components, followed by mixing of the oxides resulting therefrom or, more particularly, by decomposition of a mixture of nitrates of the heavy metals concerned, doped with ammonium nitrate.

A first type of process, described in U.S. Pat. No. 4,397,778 or in FR-A-2,501,061, consists in precipitating together a mixed solution of nitrates of heavy metals such as uranium and plutonium, by means of ammonia, in separating the coprecipitate from the mother liquors containing ammonium nitrate in solution, in drying it and in calcining it, to obtain the mixture of pulverulent metal oxides, the particle granulometry of which is more or less controllable.

This first type of process also has the major disadvantage of giving rise to a radioactive effluent containing essentially ammonium nitrate in solution, contaminated with heavy metals, which must be processed before being discharged.

Another type of process, described in FR-A-2,526,006, consists in separately decomposing heavy metal nitrates such as, for example, plutonium nitrate and uranyl nitrate, in reducing uranium trioxide to dioxide and in then mixing and finely grinding the oxides thus obtained and in pelleting and sintering them.

However such a process leads in obtaining pellets in which the distribution of oxides is not uniform.

Another type of process of BE-A-891,819 consists in converting together, by thermal decomposition at a temperature of between 300° C. and 800° C. in the presence of 0.5 to 5 mole of ammonium nitrate per mole of heavy metals (in total), of the aqueous solutions containing one or several concentrated heavy metal nitrates, into metal oxide powders which lend themselves to densification by sintering.

However, such a process is accompanied by substantial disadvantages including, in particular, the high consumption of ammonium nitrate and the large increase in the gaseous effluents to be reprocessed.

It is known from EP-A-0,328,742, a process for producing a mixture of metal oxides of nuclear fuel from a solution of nitrate containing different elements having various degree of oxidation. The solution is sprayed in a first region of a furnace through a nozzle by the means of a gas wich is heated at a first temperature allowing the solution to be very rapidly dried and to be denitrified at least partially. The sprayed solution then goes through several warming regions where it is successively evaporated, subjected to a denitrification and calcinated at least partially and separated.

This process gives rise to droplets of different sizes which pass through the furnace with different speeds. The decomposition is not instantaneous when the spraying of the solution occurs, but takes place at any point of a region of the furnace. The droplets are heated relatively slowly from the initial hot gas to the last region of the furnace, leading to a sequential and very incomplete denitration. Another disadvantage of the process is the building up of disturbing deposits which clog up the walls of the furnace.

It is known from EP-A-0,143,726, a process for the denitration of metal nitrates in two steps, the first of which of uncomplete dehydratation and the second of which of calcination in the presence of steam.

The functional conditions of the calcination are very particular and could lead to a slow reaction with a poor yield.

DE-A-38,02,047 describes a process for the separation of a radioactive metal from an aqueous solution which contains ammonium nitrate and/or ammonium carbonate and/or the metal in the form of nitrate or carbonate. This aqueous solution is sprayed in a flame vaporizing burner having a spraying nozzle, is blowed up and decomposed under the inflow of a combustion gas and an oxidant gas.

The solution sprayed at ambient temperature by the fuel and oxidant which have not reacted, will accordingly hold back the ignition and the kinetic of the combustion reaction and consequently the decomposition of nitrates. Another disadvantage of the process is that it leads to produce n-oxides or aggregates of metal oxides. Another disadvantage of the process is the presence of ammonium nitrate and/or ammonium carbonate which will generate a great volume of gaseous effluent to be retreated. Still another disadvantage of the process is the risk linked to the thermal decomposition of ammonium nitrate, especially if it is uncomplete because of the device used.

This is why the invention follows the objective not only of eliminating the abovementioned disadvantages but also of satisfying other, more ambitious objectives. The subject-matter of the invention is consequently:

a process for the thermal decomposition of heavy metal nitrates in solid form or in the form of a mixture in aqueous solution, for the direct production of powders of ceramic quality, provided with a sufficient specific surface for these powders to lend themselves easily to a conversion into nuclear fuel pellets containing mixed metal oxides;

to provide a pulverulent mixture of heavy metal oxides and, in this mixture, $UO_3$ with a specific surface that is adapted to the production processes by reduction of uranium trioxide to uranium dioxide;

to make available a process leading to the production of a metal oxide powder which has a specific surface at least equal to 2 $m^2g^{-1}$;

to supply oxides that are compatible with obtaining ceramic pellets of high mechanical strength in which the distribution of the metal oxides is uniform;

to provide a process capable of being applied to the products of a nuclear fuel reprocessing plant for the production of mixed fuel pellets meeting the required specifications;

to eliminate all or part of the operations of grinding the oxides, alone or as a mixture, preceding the obtention of the fuel pellets;

to dispense with all or part of the ultragrinding operations which are usually necessary to dissolve completely the pellets discarded in the course of manufacture, and those at the end of their life in a nuclear reactor.

SUMMARY OF THE INVENTION

The invention relates to a process for obtaining a pulverulent mixture of metal oxides, of appropriate reactivity, belonging to the nuclear industry, by thermal decomposition of their nitrates which are in the form of an aqueous solution or of a mixture of solids which are pulverulent or made pulverulent.

According to the invention the process is characterized in that, in a contact zone of a reaction chamber, the thermomechanical contact is produced between the solution or the solid mixture and a gaseous fluid introduced simultaneously into the reaction chamber, this gaseous fluid being at a temperature that is at least equal to the decomposition temperature of the nitrates and having a mechanical energy that is sufficiently high to produce a fine pulverization of the solution or a fine dispersion of the solid mixture, and to carry out instantaneously the decomposition of the nitrates.

DETAILED DESCRIPTION OF THE INVENTION

According to the process of the invention, in a contact zone of a reaction chamber, a thermomechanical contact is produced between the mixture of the metal nitrates constituting a dense phase and a gaseous fluid provided with great mechanical energy and also provided with a temperature that is at least equal to the decomposition temperature of the nitrates.

The mixture of metal nitrates constituting the dense phase is generally introduced along an appropriate axis at the contact zone and is converted therein into fine pulverization when the mixture is in a liquid state, or into fine dispersion when the mixture is in a pulverulent solid state.

The gaseous fluid provided with a great mechanical and thermal energy is introduced simultaneously with the dense phase into the contact zone in the form of a symmetrical whirled flow. This whirled flow, which is coaxial with the main axis of the reaction chamber, has the property of converting the mixture of metal nitrates into a particularly refined dispersion of microdroplets or powder. This mixture is caught by the gaseous fluid, previously heated to a high temperature, according to an abrupt and brief mechanical contact, and consequently subjected to a heat effect which is sufficient to bring about the instantaneous decomposition of the metal nitrates to a mixture of pulverulent oxides.

The specific surface of the metal oxide powder resulting from the thermal denitration determines the reactivity of this powder with regard to the subsequent physical or chemical conversions in the nuclear industry. This specific surface depends on the physicochemical characteristics of the said powder and in particular on its fineness. This phenomenon is verified in the case of the thermal denitration of a mixture of nitrates of uranyl, plutonium, thorium, caesium, ruthenium and of rare earths such as, for example, gadolinium and cerium.

Thus, for example in the case of thermal denitration of a mixture of nitrates of uranyl and of another element, the reactivity of the oxide mixture obtained depends at the same time on the specific surface of at least one of the uranium oxides produced ($UO_3$, $U_3O_8$ and $UO_2$) and of the oxide of the other element.

Consequently, the operating conditions of the process according to the invention must control the specific surface of the powders containing, as mixture, at least one of the uranium or plutonium oxides, associated with one another or associated separately or together with at least one of the oxides of thorium, caesium, ruthenium and of rare earths such as, for example, gadolinium or cerium: the specific surface of the mixture of pulverulent oxides is desirably at least equal to 2 $m^2g^{-1}$ and preferably at least equal to 7 $m^2g^{-1}$.

When the mixture of metal nitrates to be decomposed is in liquid phase, the concentration of metals which are present in the mixture is desirably between 100 g/l and 1400 g/l (expressed in g of metals per liter of solution).

The acidity of the liquid phase may vary within a wide range such as being capable of reaching approximately 8 N: it does not rule out the application of the process according to the invention.

When the mixture of metal nitrates to be decomposed is a powder, the concentration of metals is expressed in the form of the molar ratio:

$$R = \frac{\text{number of moles of } M}{\text{total number of moles of metals in the mixture}}$$

in which M is one of the metals uranium, plutonium, thorium, caesium, ruthenium, the rare earths such as gadolinium or cerium and R being between 0 and 1 (limits excluded).

In the case of the simultaneous presence in the pulverulent mixture, for example:
- of uranium and of plutonium, the molar ratio Pu/(U+Pu) may vary preferably from 0.02 to 0.80 and very preferably from 0.05 to 0.15;
- of uranium and of gadolinium, the molar ratio Gd/(U+Gd) may very preferably from 0.01 to 0.20 and very preferably from 0.02 to 0.10;
- of uranium and of cerium, the molar ratio Ce/(U+Ce) may vary preferably from 0.02 to 0.80 and very preferably from 0.05 to 0.15;
- of uranium or of plutonium, which are associated with one another or else either or both associated with at least one of the elements thorium, caesium, ruthenium and the rare earths, including gadolinium and cerium, each of these latter elements cited may be present in the mixture according to wide limits which are either inherent in the composition of the recycling materials or desired for the production of the nuclear fuel.

The gaseous fluid used in the process of the invention is introduced into the contact zone provided with high thermomechanical energy: it is introduced therein in the form of a symmetrical whirled flow.

According to a preferred alternative form, the axis of symmetry of the whirled flow of the gaseous fluid introduced coincides not only with the lengthwise axis of the reaction chamber but also with that of the device for injection of the dense phase.

The heat necessary for the decomposition of the mixture of metal nitrates is supplied by the hot gaseous fluid. This gaseous fluid may consist of air, of an inert gas such as nitrogen, or of gases resulting from the combustion:
- of a fuel which may be hydrogen or a hydrocarbon, preferably gaseous, such as methane, ethane, propane or butane;
- in the presence of an oxidant chosen from the group consisting of air, oxygen or a mixture of the two.

The hot gaseous fluid may be desirably of a more or less reducing nature by virtue, for example, of the presence of a reducing gas such as hydrogen or carbon monoxide, or by virtue of an incomplete combustion when the hot gas results from the combustion of a fuel in the presence of an oxidant.

When the gaseous fluid to be introduced is air or an inert gas, with which a reducing gas may be mixed, it may be heated to the desired temperature by an indirect heating device such as, for example, electrical heating external to the reaction chamber. However, when the gaseous fluid to be introduced results from the combustion of a fuel in the presence of an oxidant, it may be generated in a combustion chamber that is independent of the reaction chamber (heating ex situ) or associated with the reaction chamber (heating in situ).

The temperature which must prevail in the contact zone and, with even greater reason, in the reaction chamber to permit the instantaneous decomposition of the mixture of metal nitrates, called the "set temperature", lies in the range from 250° C. to 1000° C. and preferably from 350° C. to 800° C.

The set temperature acts on either the regulation of the means of heating of the gaseous fluid or the entry flow rate of the mixture of the metal nitrates to be decomposed.

The reaction chamber in which the decomposition of the metal nitrates is performed and in which the contact zone is to be found, where the thermomechanical contact is established between the mixture of metal nitrates constituting the dense phase and the gaseous fluid provided with a high thermomechanical energy, may be chosen from those described, for example, in French Patent No. 2,257,326, European Patent No. 0,007,846, in U.S. Pat. No. 3,041,136 or else in the article Informations Chimie, No. 342, October 1992.

In the course of the decomposition of the mixture of metal nitrates there is obtained, on the one hand, a mixture of metal oxides offering the desired reactivity and, on the other hand, a gaseous flow which is separated off. The gaseous flow contains the $NO_x$ coming from the decomposition of the metal nitrates, which is subsequently recovered for the most part in the form of $HNO_3$.

The mixture of metal oxides which are obtained after separation of the gaseous flow may be subjected to an action of reduction by a reducing agent:
- for obtaining, for example, a mixed oxide rich in uranium dioxide ($UO_2$) of sufficient reactivity to be subsequently converted into $UF_4$ and then $UF_6$ or uranium metal;
- or else, after an optional precompaction, to be compressed, pelleted and sintered with a view to being subsequently employed as nuclear fuel.

It has been found that the mixture of the mixed oxides ($UO_2$,$PuO_2$), obtained according to the process of the invention after reduction or the sintered product resulting therefrom, is easily dissolved by $HNO_3$.

This easy dissolution is a characteristic of the mixtures of metal oxides originating from the process according to the invention, which manifests itself in contradiction to the state of the art: it is known, in fact, that if the components ($UO_2$ and $PuO_2$) are not intimately associated at the time when the pellet is formed, this pellet, after being used in a nuclear reactor, is difficult to dissolve using $HNO_3$ alone.

This is why the process of the invention is found to be particularly suitable for obtaining a nuclear fuel in the form of pellets which can be easily recycled at the end of their life.

Thus, it appears that the process according to the invention, applied to the treatment of mixtures of heavy metal nitrates such as uranyl and plutonium nitrates, which are associated with one another, or associated together or separately with at least one of the nitrates of thorium, caesium, ruthenium, of rare earths such as, for example, gadolinium or cerium, results, in its main objective, in obtaining of a mixture of metal oxides which have a specific surface that is adequate to give it an excellent reactivity, but also provides a mixture of metal oxides within which the said oxides are particularly well dispersed with regard to each other, and this, in particular, permits the recycling of the mixed oxide powders or of pellets exhibiting anomalies in respect of the specifications.

BRIEF DESCRIPTION OF THE DRAWING

The invention will be better understood by virtue of the illustration thereof which is given by the diagram of an industrial nature of the circuit for production of the nuclear fuel incorporating the process according to the invention (FIG. 1).

According to the diagram a mixed mixture in solution is prepared (in A) by simultaneous introduction of uranyl and plutonium nitrates, in suitable quantities.

Figure 1:
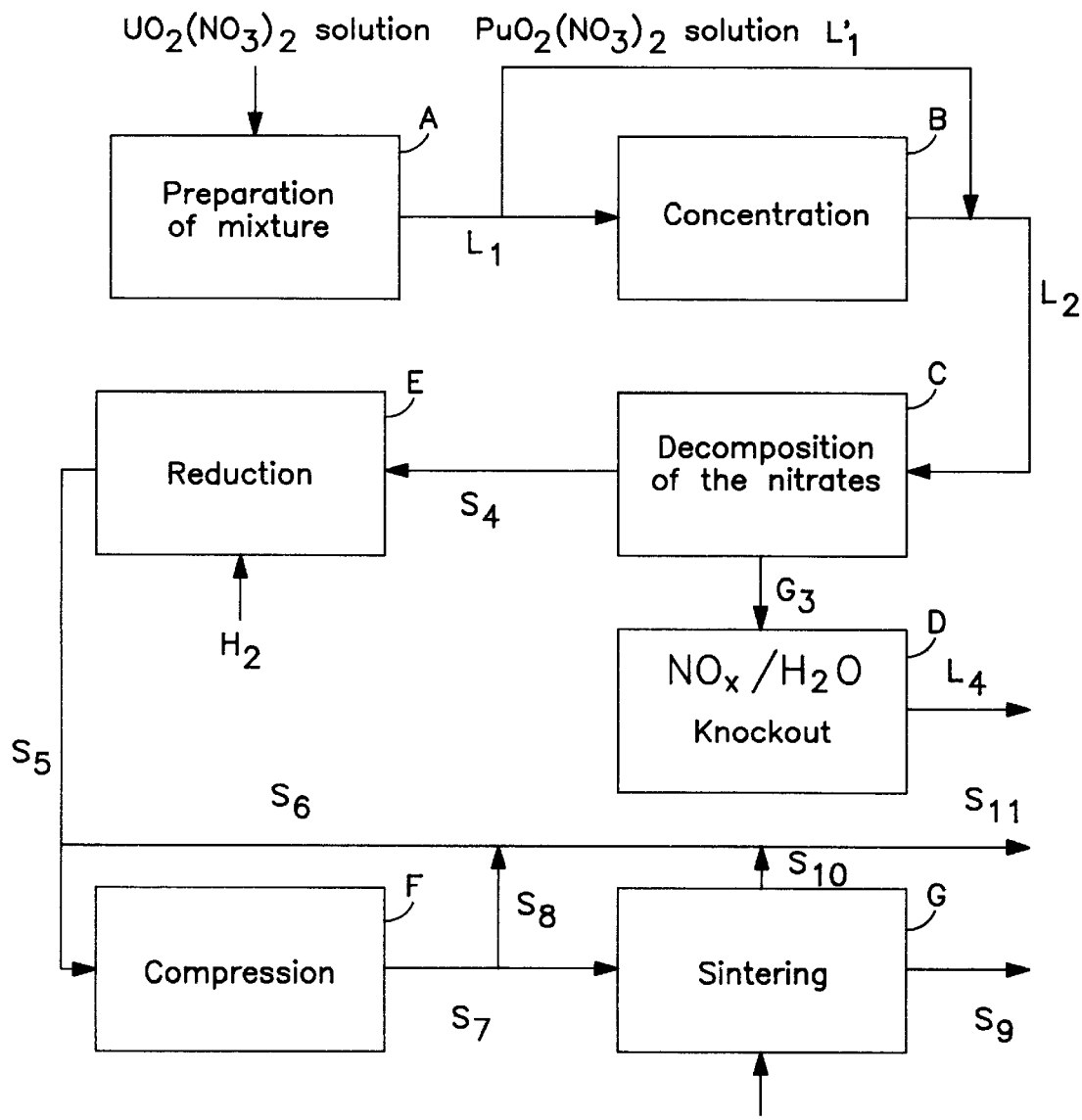

This intimate mixture of nitrates in solution is optionally introduced along L1 into a concentration zone (B) for obtaining the desired concentration level.

The desired concentration generally corresponds to uranyl nitrate hexahydrate being obtained molten in its water of crystallization, in which the other nitrates present are in solution or finely dispersed.

In the case where the concentration level is already reached during the mixing (in A), the said mixture is led directly via L'1 and L2 into the decomposition zone (C).

This mixture is introduced into the contact zone of the reaction chamber and is converted therein into fine pulverization by intimate contact with the gaseous fluid provided with a high thermomechanical energy, the said gaseous fluid being introduced in the form of a symmetrical whirled flow. The set temperature of the reaction chamber is chosen in the range from 250° C. to 1000° C.

During the abrupt and brief thermomechanical contact the metal nitrate mixture converted into very fine particles is decomposed, generating a gaseous flow (G3) composed of nitrous vapours $NO_x$ and steam, and a pulverulent mixture of metal oxides (S4) which has a specific surface of at least 7 $m^2g^{-1}$, which gives it the reactivity that is sought after.

The gaseous flow (G3) is then led into the processing zone (D) (absorption tower), where it is treated with a recirculating $HNO_3$ solution, generating a concentrated $HNO_3$ solution (L4) which may be employed, for example, for dissolving operations.

The pulverulent mixture (S4) is then introduced into the reduction zone (E), where it is subjected to reduction by means of a stream of hydrogen heated to a temperature of between 600° C. and 800° C., in order that the mixture of metal oxides referred to above may contain uranium in the form of $UO_2$ of good reactivity.

After reduction, the mixture of metal oxides is led via (S5) into the compression zone (F), where it is converted into pellets of appropriate density.

The pellets (S7) are then sintered in the sintering zone (G) by being kept in a stream of hydrogen at a sufficient temperature (approximately 1700° C.) for the necessary time.

The sintered pellets (S9) are then ready to be used in the fuel assemblies employed in the nuclear reactors of the PWR, BWR or other types.

The recycling of the manufacturing rejects, via (S6), (S8), (S10) and, lastly, (S11), after they are dissolved, takes place in simplified conditions.

As the Applicant has ascertained, the process according to the invention leads to fuel pellets of sintered oxides (S10) which are easily soluble in nitric acid alone, without addition of hydrofluoric acid as the state of the art recommends.

The invention will be understood better by virtue of the examples which are formulated below solely by way of illustration.

EXAMPLE 1

This example illustrates the decomposition of a mixture of metal nitrates in solution, like that obtained from an irradiated fuel by nitric dissolving after separation of plutonium and of fission products generated.

This mixture is a solution of uranyl nitrate accompanied by caesium and ruthenium, of the following composition:

| | |
|---|---|
| uranium | 350 g/l |
| caesium | 25 ppm/U |
| ruthenium | 5 ppm/U |
| $HNO_3$ | 6 N |

This solution was pulverized in a contact zone of a reaction chamber, as described in French Patent No. 2,257, 326, by a stream of nitrogen heated electrically to a temperature of 1100° C. The set temperature regulating the gaseous flow was 400° C. The flow rate of the metal nitrate solution was 10 liters/hour.

An oxide mixture rich in $UO_3$, also containing caesium and ruthenium oxides, was thus obtained. The specific surface of the oxide mixture was 10 $m^2g^{-1}$. This pulverulent oxide mixture was successfully employed in a preparation cycle of nuclear fuels.

As for the gaseous phase resulting from the thermal decomposition of the metal nitrates, this was cooled and absorbed using a recirculating aqueous solution of nitric acid.

EXAMPLE 2

This example relates to the decomposition according to the invention of a mixture of uranyl and gadolinium nitrates, in the form of an aqueous solution with the composition:

| | |
|---|---|
| uranium | 400 g/l |
| gadolinium | 14 g/l |
| H⁺ acidity (HNO₃) | 0.5 N |

This solution was pulverized in the form of fine droplets in a contact zone of a reaction chamber of a decomposition device known under the name of "SPIN FLASH" from the APV-Baker Company (Informations Chimie, No. 342, October 1992).

The temperature of the whirled gaseous phase, which is air, was 1000° C. The set temperature of the contact zone was 450° C. The flow rate of the solution of metal nitrates was 5 l/hour.

After separation of the gaseous phase containing the $NO_x$, a mixture of oxides $UO_3,Gd_2O_3$ was collected which had a mean particle granulometry close to 10 μm. The specific surface of the mixture was 16 $m^2g^{-1}$.

After reduction under a stream of hydrogen at 700° C., a pulverulent mixture of oxides $UO_2,Gd_2O_3$ was obtained which had a specific surface of approximately 6 $m^2g^{-1}$ and which had very good sinterability.

EXAMPLE 3

This example illustrates the case of the thermal decomposition of a mixture of metal nitrates which, after purification by means of tributylphosphate, had the appearance of a powder composed essentially of uranyl nitrate. This powder contained:

| | |
|---|---|
| uranium | 47.0% by weight |
| caesium (approximately) | 40 ppm relative to U + Cs |
| caesium, | Cs/(U + Cs) molar ratio = 4'10⁻⁵ |

The nitrate mixture was initially in aqueous solution. This solution was concentrated to 1200 g/l of uranium and then subjected to a flaking operation and was ground until the powder intended for the decomposition operation according to the invention was obtained.

The powder thus obtained was introduced by means of a screw conveyor into the contact zone of a reaction chamber, as described in European Patent No. 0,007,846, in which the hot gases are produced in situ by the complete combustion of propane.

The hot gases produced, providd with a high thermomechanical energy, came into the contact zone simultaneously with the solid phase, in the form of a symmetrical whirled flow (coaxially with the device for introducing the powder).

The flow rate of the powder introduced was 18 kg/hour. The set temperature of decomposition of the nitrates was 650° C.: this temperature controlled the flow rate of propane used in the combustion chamber.

From the reaction chamber a fine oxide powder was extracted, consisting of $U_3O_8$ (80% by weight), $UO_3$ (approximately 20% by weight) and $Cs_2O$ (40 ppm expressed as moles of Cs relative to U+Cs).

The powder obtained exhibited a good reactivity: specific surface of 10 $m^2g^{-1}$, and was intended to be employed in a cycle of preparation of nuclear fuel.

As for the gaseous phase containing $NO_x$, this was cooled and treated with an aqueous solution of $HNO_3$.

EXAMPLE 4

This example illustrates the operating diagram of FIG. 1.

According to this figure, an aqueous solution of metal nitrates which was obtained by mixing uranyl and plutonium nitrates (in A) had the composition, after concentration (in B):

| | |
|---|---|
| uranium | 1040 g/l |
| plutonium | 66 g/l |
| HNO₃ acidity | 4.0 N |
| Pu/(U + Pu) molar ratio = | 0.059 |

This concentrated solution was introduced (in C) into a device operating according to the same principle as that described in Example 3, where it was subjected to a thermomechanical decomposition, in the following conditions:

| | |
|---|---|
| set temperature | 450° C. |
| flow rate of the solution to be treated | 1 l/hour |

The gases resulting from the decomposition were treated (in D) in an absorption tower with a recirculating solution of $HNO_3$.

The powder obtained (in C) was made up of $UO_3$ and $PuO_2$, of high specific surface (18 $m^2g^{-1}$) and was treated (in E) with a stream of hydrogen at 650° C., and was then pelleted (in F) and sintered (in G) at 1700° C. in the presence of hydrogen.

The mixed pellets of $UO_2$ and $PuO_2$ thus obtained had a density equal to 94.8% of the theoretical density.

All the products outside of specification were recycled via S11.

EXAMPLE 5

This example illustrates the case of the decomposition of mixed uranium and plutonium nitrate in solution, with a view to obtaining directly a pulverulent mixture of $UO_2$, $PuO_2$ by means of a highly thermomechanical and reducing gaseous phase.

In this case the solution is the same as that used in Example 4 and has the composition:

| | |
|---|---|
| uranium | 1040 g/l |
| plutonium | 66 g/l |
| HNO₃ acidity | 4.0 N |

The hot gases consisted of a stream of nitrogen containing 4% of hydrogen, giving the gases a reducing capacity with regard to the uranium oxides. The gases were heated to the temperature of 1100° C. by means of the heating system employed in Example 1. The reaction chamber was also the same one as that used in the said example.

The flow rate of the solution of nitrates to be decomposed was 0.6 l/hour and the set temperature was 600° C.

In these operating conditions a mixed oxide consisting essentially of $UO_2$ and $PuO_2$ was obtained in the decomposition chamber. Approximately 3% of uranium was in the form of $U_3O_8$.

EXAMPLE 6

This example relates to the decomposition according to the invention of a mixture of uranyl and cerium nitrates which was in the form of an aqueous solution with the composition:

| | |
|---|---|
| uranium | 1065 g/l |
| cerium | 70 g/l |
| H$^+$ acidity (HNO$_3$) | 0.01 N |
| Ce/(U + Ce) molar ratio ≈ | 0.1 |

This solution was introduced (at C) into a device operating according to the same principle as that described in Example 3. It was subjected therein to a thermomechanical decomposition under the following conditions:

the set temperature of the contact zone was 700° C.;

the flow rate of the solution of metal nitrates was 67 l/hour.

After separation of the gaseous phase containing the NO$_x$, an oxide powder was collected which had the characteristics of a solid solution of U/Ce mixed oxides. This powder had a mean particle granulometry close to 5 μm and a specific surface of 10.9 m$^2$g$^{-1}$.

After reduction with hydrogen at 625° C., a mixed oxide powder was obtained which had a specific surface of approximately 6 m$^2$g$^{-1}$. This powder was pelleted and sintered at 1760° C. under hydrogen.

What is claimed is:

1. A process for obtaining a mixture of pulverulent oxides of metals, of appropriate reactivity, belonging the nuclear industry, from a mixture of nitrates of said metals in the form of an aqueous solution or of a mixture of particulate solids said process comprising, in a contact zone of a reaction chamber, thermomechanically contacting said aqueous solution or said mixture of particulate solids with a gaseous fluid introduced simultaneously into the reaction chamber, said gaseous fluid being at a temperature at least as high as the decomposition temperature of the nitrates and having sufficient mechanical energy to produce a sufficiently fine pulverization of the solution or of the dispersion of said mixture of particulate solids, as to instantaneously bring about the decomposition of the nitrates.

2. A process according to claim 1, wherein the mixture of metal nitrates comprises at least one of the metals U or Pu, which are associated with one another or associated, separately or together, with at least one of the metals thorium (Th), cesium (Cs), ruthenium (Ru) and the rare earths including gadolinium (Gd) and cerium (Ce).

3. A process according to claim 1, wherein the mixture of metal nitrates, of the nuclear industry is in the form of an aqueous solution having a, concentration of metals of between 100 g/l and 1400 g/l.

4. A process according to claim 1 wherein said aqueous solution has an acidity of approximately up to 8 N.

5. A process according to claim 1, the mixture of metal nitrates to be decomposed is a mixture of particulate solids having a concentration expressed in the form of the molar ratio:

$$R = \frac{\text{number of moles } M}{\text{total number of moles of metals in the mixture}}$$

in which M is one of the metals uranium, plutonium, thorium, cesium, ruthenium and the rare earths including gadolinium and cerium, R being between 0 and 1 (limits excluded).

6. A process according to claim 1, wherein the mixture to be decomposed contains nitrates of uranium and plutonium, having a composition, expressed by the ratio Pu/(U+Pu) of from 0.02 to 0.80.

7. A process according to claim 1, wherein the mixture to be decomposed is a powder containing nitrates of uranium and gadolinium, having a composition, expressed by the ratio Gd/(U+Gd), of from 0.01 to 0.02.

8. A process according to claim 1, wherein the mixture to be decomposed is a powder containing uranium and cerium nitrates having a composition, expressed by the ratio Ce/(U+Ce), of from 0.02 to 0.80.

9. A process according to claim 1, wherein the hot gaseous fluid is introduced into the contact zone in the form of a symmetrical whirled flow.

10. A process according to claim 9, wherein the axis of symmetry of the whirled flow of the gaseous fluid introduced coincides with the lengthwise axis of the reaction chamber and with the axis of the device for injection of the dense phase.

11. A process according to claim 1, wherein the gaseous fluid consists of air or of an inert gas.

12. A process according to claim 11, wherein the inert gas is nitrogen.

13. A process according to claim 11, wherein the gaseous fluid comprises a reducing agent which is hydrogen or carbon monoxide.

14. A process according to claim 1, wherein the gaseous fluid is heated to the desired temperature by an electrical indirect heating device external to the reaction chamber.

15. A process according to claim 1, wherein the gaseous fluid is a combustion gas.

16. A process according to claim 15, wherein the gaseous fluid results from the combustion of hydrogen or of a hydrocarbon in the presence of an oxidant.

17. A process according to claim 16, wherein the hydrocarbon is chosen from the group consisting of methane, ethane, propane, and butane.

18. A process according to claim 16, wherein the oxidant is chosen from the group consisting of air, oxygen and a mixture thereof.

19. A process according to claim 15, wherein the gaseous fluid is made reducing by an incomplete combustion.

20. A process according to claim 15, wherein gaseous fluid results from the combustion of a fuel in the presence of an oxidant, said oxidant being generated in an external combustion chamber that is independent of the reaction chamber.

21. A process according to claim 15, wherein the gaseous fluid results from the combustion of a fuel in the presence of an oxidant, said oxidant being generated in an internal combustion chamber that is dependent on the reaction chamber.

22. A process according to claim 1, wherein the temperature of instantaneous decomposition is in the range from 250° C. to 1000° C.

23. A process according to claim 22, wherein the heating of the gaseous fluid or the entry flow rate of the mixture of metal nitrates to be decomposed is regulated in response to said temperature of instantaneous decomposition.

24. A process according to claim 1, wherein the pulverulent mixture of metal oxides containing at least one of the oxides of uranium and of plutonium, which are associated with one another, or associated separately or together with at least one of the oxides of thorium, of cesium, of ruthenium and of rare earths including gadolinium and cerium, has a specific surface equal to at least 2 m$^2$g$^{-1}$.

25. A process according to claim 24, further comprising subjecting the mixture of metal oxides to reduction using a reducing agent.

26. A process according to claim 1, wherein the $NO_x$ resulting from the decomposition of the metal nitrates are recovered by conversion into $HNO_3$.

27. In a process comprising producing and/or recycling of nuclear fuel, the improvement comprising conducting the process of claim 1.

28. A process according to claim 22, wherein the temperature is 350° to 800° C.

29. A process according to claim 24, wherein the specific surface is at least equal to 7 $m^2g^{-1}$.

30. A process according to claim 6, wherein the ratio is 0.05 to 0.15.

31. A process according to claim 7, wherein the ratio is 0.02 to 0.10.

32. A process according to claim 8, wherein the ratio is 0.05 to 0.15.

* * * * *